United States Patent
Gassner et al.

(10) Patent No.: US 10,108,311 B2
(45) Date of Patent: Oct. 23, 2018

(54) SYSTEM AND METHOD FOR DISPLAYING AN ORGANIZATION DIRECTORY

(71) Applicant: Veeva Systems Inc., Pleasanton, CA (US)

(72) Inventors: Peter Gassner, Pleasanton, CA (US); Dean Alms, Alamo, CA (US); Greg Barker, Pleasanton, CA (US); Basel Qumsiyeh, San Francisco, CA (US)

(73) Assignee: Veeva Systems Inc., Pleasanton, CA (US)

( * ) Notice: Subject to any disclaimer, the term of this patent is extended or adjusted under 35 U.S.C. 154(b) by 571 days.

(21) Appl. No.: 14/817,792

(22) Filed: Aug. 4, 2015

(65) Prior Publication Data

US 2017/0038944 A1    Feb. 9, 2017

(51) Int. Cl.
*G06F 3/0481*    (2013.01)
*G06F 17/30*    (2006.01)
*G06Q 10/10*    (2012.01)

(52) U.S. Cl.
CPC .... *G06F 3/04817* (2013.01); *G06F 17/30867* (2013.01); *G06Q 10/105* (2013.01)

(58) Field of Classification Search
CPC combination set(s) only.
See application file for complete search history.

(56) References Cited

U.S. PATENT DOCUMENTS

| | | | | |
|---|---|---|---|---|
| 2005/0240961 | A1* | 10/2005 | Jerding | H04N 5/44543 725/37 |
| 2008/0243548 | A1* | 10/2008 | Cafer | G06F 3/04817 705/3 |
| 2014/0019537 | A1* | 1/2014 | Doshi | G06Q 10/10 709/204 |
| 2014/0046956 | A1* | 2/2014 | Zenger | G06F 17/30445 707/748 |
| 2014/0358807 | A1* | 12/2014 | Chinnappan | G06Q 10/06 705/320 |
| 2015/0248644 | A1* | 9/2015 | Zenger | G06Q 10/105 705/320 |
| 2015/0317574 | A1* | 11/2015 | Hull | G06Q 10/06 705/348 |
| 2016/0224205 | A1* | 8/2016 | Fulton | G06F 3/04817 |
| 2016/0277903 | A1* | 9/2016 | Poosala | H04W 4/12 |
| 2016/0378067 | A1* | 12/2016 | Bishop | G04F 3/06 368/241 |

* cited by examiner

*Primary Examiner* — Hien L Duong

(57) ABSTRACT

Systems and methods for displaying an individual profile page in an organization directory. The method comprises storing the individual's name and start date with the organization in a database; receiving a request for displaying the individual profile page; comparing the individual's start date with the current date to determine the individual's tenure with the organization; and determining using a first type of icon to represent a first period of time and a second type of icon to represent a second period of time.

19 Claims, 10 Drawing Sheets

SYSTEM AND METHOD FOR DISPLAYING AN ORGANIZATION DIRECTORY

BACKGROUND

The subject technology relates generally to organization directories, and more particularly to displaying personnel information in organization directories.

An organization directory can help to communicate the skills, responsibilities and contact information of its people and their reporting lines. Nowadays, many organizations have complex structures, and hundreds of thousands of members, employees, interns and temporary workers ("individuals") who have been with the organization for a long period of time. And users, who may be one of such individuals, or human resource staff, often use handheld devices with a small screen to access the organization directory. Thus, it is desirable to display the personnel information in a clean and simple way.

SUMMARY

The disclosed subject matter relates to a method for displaying an individual profile page in an organization directory. The method comprises: storing the individual's name and start date with the organization in a database; receiving a request for displaying the individual profile page; comparing the individual's start date with the current date to determine the individual's tenure with the organization; and determining using a first type of icon to represent a first period of time and a second type of icon to represent a second period of time. The first period of time is longer than the second period of time. The method further comprises: determining a first number of the first type of icon and a second number of the second type of icon needed to represent the individual's tenure with the organization; and displaying the individual profile page, wherein the individual profile page comprises a first area for displaying the individual's tenure with the organization, and wherein the first area comprises the first type of icon and the second type of icon.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

The subject technology is directed to techniques for displaying personnel information in an organization directory. An organization directory may provide a wealth of information in an easy to read format. Each individual may have a profile page, which may include his/her ID, name, picture, job title, start date, contact information (e.g., office phone number, email address, mobile phone number, and office address), reporting line information (e.g., his manager, individual(s) reporting to him/her, and links to their profile pages), skills, responsibilities, and message(s) left to other users. The individual profile page may also include the amount of time the individual has been with the organization. To allow users to quickly and easily identify who recently joined the organization and who has been with the organization for longer periods of time without using too much real estate of the profile page, two or more types of icons may be used to represent the tenure. A first type of icon (e.g., a star) may represent a first period of time with the organization (e.g., each five year tenure), and a second type of icon (e.g., a circle) may represent a second period of time with the organization (e.g., each year). Hollow or partially filled circles may be used to represent a partial year. To recognize those individuals that joined the organization via acquisition, stars and circles in a different color may be used to represent the tenures they had at the acquired company. Hovering over or clicking on the icons may give users the actual number of years and months an individual has been with the organization.

Figure 1:
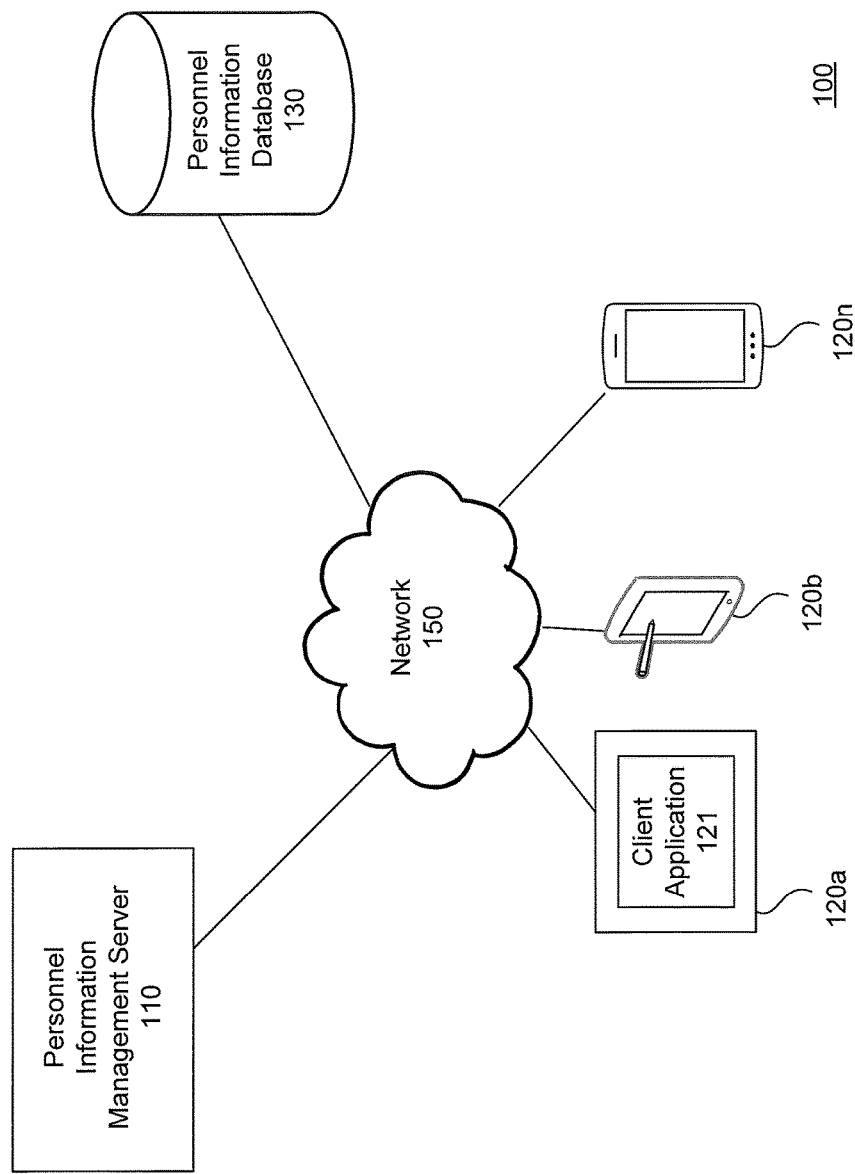
FIG. 1 illustrates an example high level block diagram of an organization directory management architecture wherein the present invention may be implemented.

FIG. 1 illustrates an example high level block diagram of an organization directory management architecture 100 wherein the present invention may be implemented. As shown, the architecture 100 may include a personnel information management server 110, a plurality of user computing devices 120a, 120b, . . . 120n, and a personnel information database 130, coupled to each other via a network 150. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a-120n may be any machine or system that is used by a user to communicate with the personnel information management server 110 and the personnel information database 130 via the network 150, and may be any commercially available computing devices including laptop computers, desktop computers, mobile phones, smart phones, tablet computers, netbooks, and personal digital assistants (PDAs). A client application 121 may run from a user computing device, e.g., 120a, to enable human resource staff, or the individuals, to access, view and/or edit personnel information in the database 130 via the network 150. User computing devices 120a-120n are illustrated in more detail in FIG. 3.

The personnel information management server 110 is typically a remote computer system accessible over a remote or local network, such as the network 150. The personnel information management server 110 could be any commercially available computing devices. A client application (e.g., 121) process may be active on one or more user computing devices 120a-120n. The corresponding server process may be active on the personnel information management server 110. The client application process and the corresponding server process may communicate with each other over the network 150, thus providing distributed functionality and allowing multiple client applications to take advantage of the information-gathering capabilities of the database 130.

In one implementation, the personnel information management server 130 may access data in the personnel information database 130, and generate an individual profile page 500, as will be described with reference to FIG. 5 and FIG. 6 below. Although the personnel information management server 110 is shown in one server, it should be appreciated that it may be implemented in multiple servers.

Figure 5:
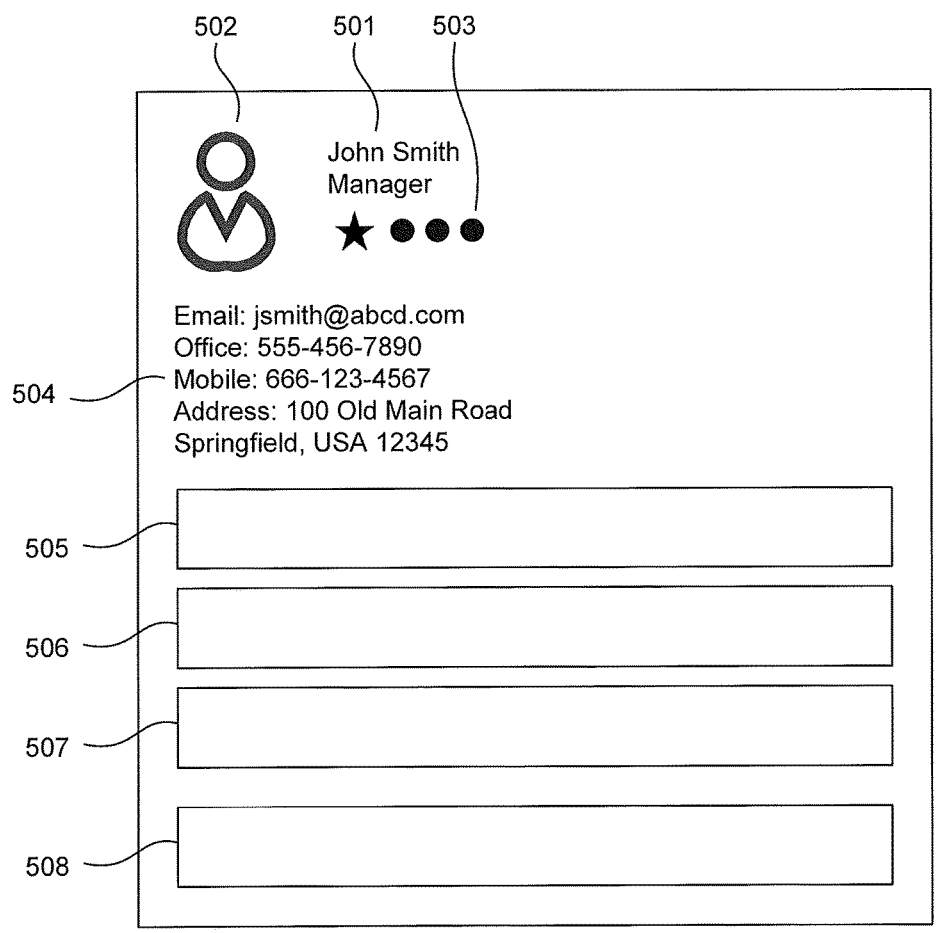
FIG. 5 illustrates an example individual profile page for displaying personnel information in an organization directory according to one embodiment of the present invention.

The personnel information database 130 may store data needed for displaying the individual profile page 500 shown in FIG. 5, e.g., an individual's ID, name, picture, job title, start date, contact information (e.g., office phone number, email address, mobile phone number, and office address), reporting line information (e.g., his manager, individual(s) reporting to him, and links to their profile pages), skills, responsibilities, and message(s) left to other users. The personnel information database 130 may be any commercially available storage devices.

In one embodiment, the personnel information management server 110 and the personnel information database 130 may run on a cloud computing platform and store and provide a central access to consistent data. Users can access data on the cloud independently by using a virtual machine image, or purchasing access to a service maintained by a cloud database provider.

In one embodiment, the personnel information management server 110 and the personnel information database 130 may be provided as Software as a Service ("SaaS") to allow users to access it with a thin client.

Figure 2:
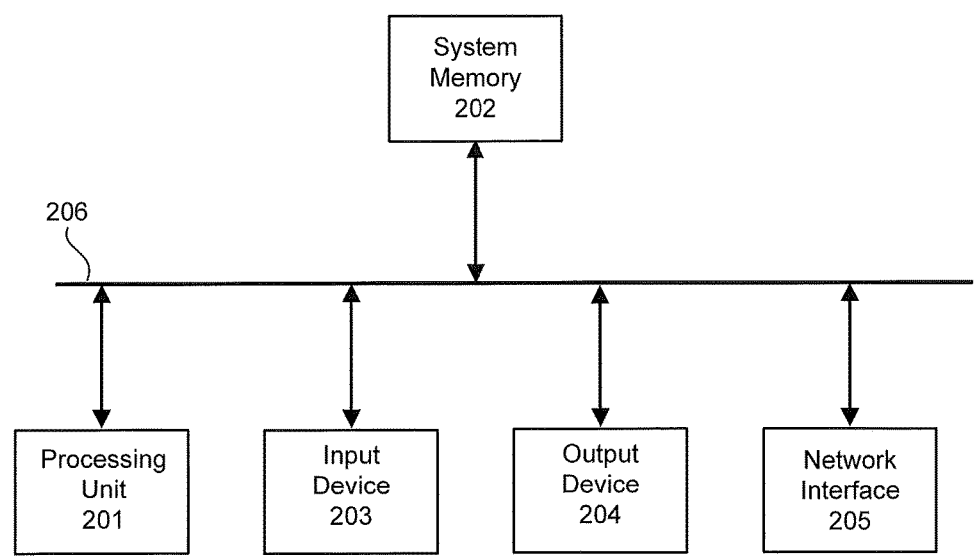
FIG. 2 illustrates an example block diagram of a computing device.

FIG. 2 illustrates an example block diagram of a computing device 200 which can be used as the user computing devices 120a-120n, and the personnel information management server 110 in FIG. 1. The computing device 200 is only one example of a suitable computing environment and is not intended to suggest any limitation as to scope of use or functionality. The computing device 200 may include a processing unit 201, a system memory 202, an input device 203, an output device 204, a network interface 205 and a system bus 206 that couples these components to each other.

The processing unit 201 may be configured to execute computer instructions that are stored in a computer-readable medium, for example, the system memory 202. The processing unit 201 may be a central processing unit (CPU).

The system memory 202 typically includes a variety of computer readable media which may be any available media accessible by the processing unit 201. For instance, the system memory 202 may include computer storage media in the form of volatile and/or nonvolatile memory such as read only memory (ROM) and/or random access memory (RAM). By way of example, but not limitation, the system memory 202 may store instructions and data, e.g., an operating system, program modules, various application programs, and program data.

A user can enter commands and information to the computing device 200 through the input device 203. The input device 203 may be, e.g., a keyboard, a touchscreen input device, a touch pad, a mouse, a microphone, and/or a pen.

The computing device 200 may provide its output via the output device 204 which may be, e.g., a monitor or other type of display device, a speaker, or a printer.

The computing device 200, through the network interface 205, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 205 may be configured to allow the computing device 200 to transmit and receive data in a network, for example, the network 150. The network interface 205 may include one or more network interface cards (NICs).

Figure 3:
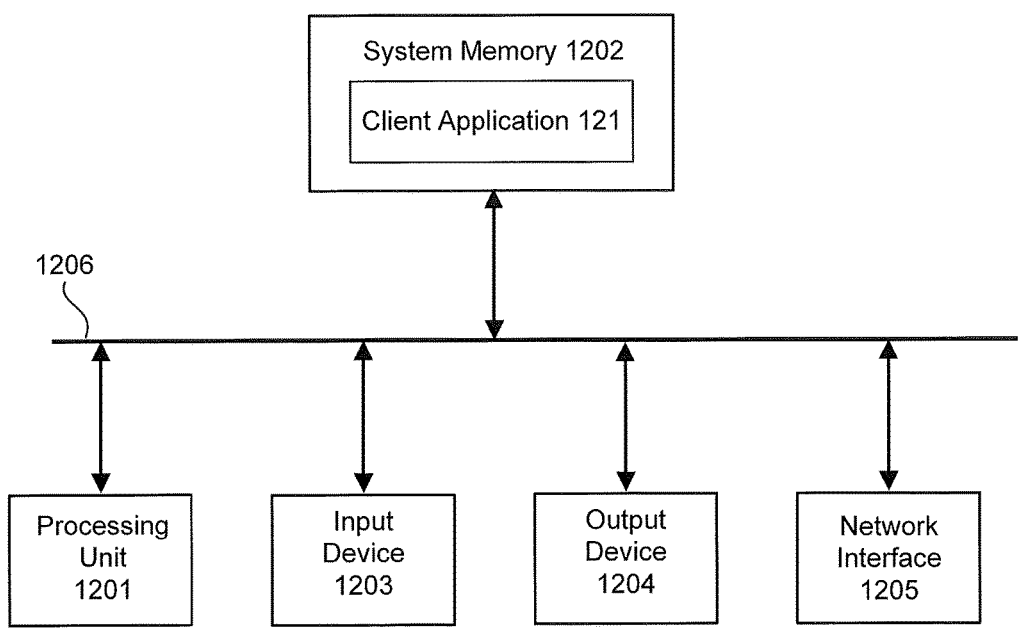
FIG. 3 illustrates an example high level block diagram of a user computing device.

FIG. 3 illustrates an example high level block diagram of a user computing device (e.g., 120a) wherein the present invention may be implemented. The user computing device 120a may be implemented by the computing device 200 described above, and may have a processing unit 1201, a system memory 1202, an input device 1203, an output device 1204, and a network interface 1205, coupled to each other via a system bus 1206. The system memory 1202 may store the client application 121. Users or human resource staff may access and/or edit personnel information in the database 130, and view the individual profile pages (e.g., 500, 700, 750, 800 and 900 shown in FIGS. 5, 7A, 7B, 8 and 9) with the client application 121.

Figure 4:
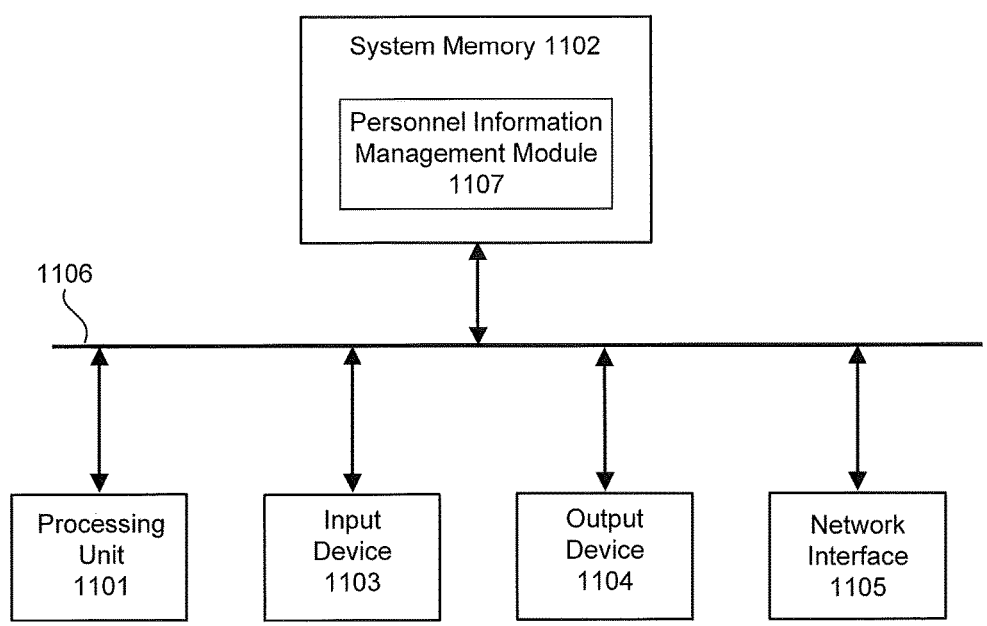
FIG. 4 illustrates an example high level block diagram of a personnel information management server according to one embodiment of the present invention.

FIG. 4 illustrates an example high level block diagram of the personnel information management server 110 according to one embodiment of the present invention. The personnel information management server 110 may be implemented by the computing device 200, and may have a processing unit 1101, a system memory 1102, an input device 1103, an output device 1104, and a network interface 1105, coupled to each other via a system bus 1106. The system memory 1102 may store a personnel information management module 1107, which may control the process 600 (as shown in FIG. 6) for generating the individual profile pages (e.g., 500, 700, 750, 800 and 900 shown in FIGS. 5, 7A, 7B, 8 and 9) and displaying the tenure information.

FIG. 5 illustrates an example individual profile page for displaying personnel information according to one embodiment of the present invention. As shown, the individual profile page 500 may have an area 501 for displaying the individual's name and job title, an area 502 for displaying his picture, an area 503 for displaying his tenure with the organization, an area 504 for displaying his contact information (which may include his email, office phone number, mobile phone number, and office address), an area 505 for displaying the reporting line information (e.g., information about his manager and direct report(s) and links to their profile pages), an area 506 for displaying his skills, an area 507 for displaying his responsibilities, and an area 508 for displaying his message(s) to other users. Human resource staff and/or the individual himself may be allowed to enter or update information in these areas. In one example, the individual has been with the organization for eight years, and two types of icons may be used in the area 503 to represent his tenure with the organization, e.g., one star representing five years and three circles each representing one year.

Figure 6:
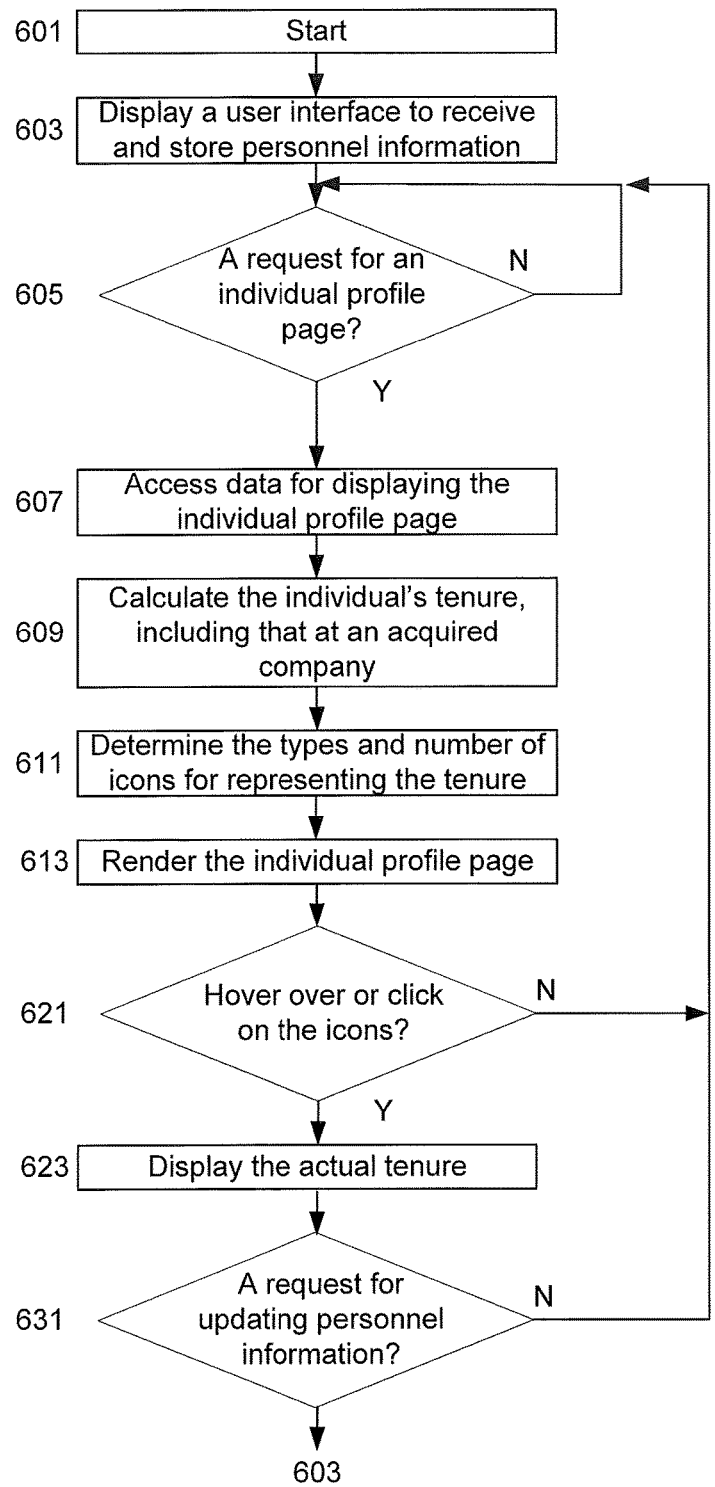
FIG. 6 illustrates an example flowchart of a method for displaying personnel information in an organization directory according to one embodiment of the present invention.

FIG. 6 illustrates an example flowchart of a method for displaying personnel information in an organization directory according to one embodiment of the present invention. The process may start at 601.

At 603, a user interface may be displayed to receive personnel information, e.g., when an individual is added to the organization directory and a new record is created, or when the personnel information needs to be updated. Such personnel information may include the individual's ID, name, picture, job title, start date, contact information (e.g., office phone number, email address, mobile phone number, and office address), reporting line information (e.g., his manager, individual(s) reporting to him, and links to their profile pages), skills, responsibilities, and message(s) left to other users. The personnel information may then be stored in the personnel information database 130.

At 605, it may be determined if a request for viewing an individual profile page is received (e.g., at the personnel information management server 110 from the client application 121 in the user computing device 120*a*).

If yes, at 607, the personnel information management server 110 may access the personnel information database 130 for data needed for displaying the individual profile page, e.g., 500. Such data may include the individual's ID, name, picture, job title, start date, contact information (e.g., office phone number, email address, mobile phone number, and office address), reporting line information (e.g., his manager, individual(s) reporting to him, and links to their profile pages), skills, responsibilities, and message(s) left to other users.

At 609, the personnel information management server 110 may calculate the individual's tenure, e.g., by comparing the individual's start date with the current date.

In one implementation, a first type of icon may be used to represent a first period of time in the individual's tenure (e.g., one star for each five years), and a second type of icon may be used to represent a second period of time in the individual's tenure (e.g., one circle for each year). At 611, the personnel information management server 110 may determine the number and types of icons to be used to represent the individual's tenure with the organization.

In one implementation, the personnel information management server 110 may first check if the individual's tenure exceeds five years. If yes, both the first type of icon and the second type of icon need to be used to represent the tenure. The personnel information management server 110 may count the individual's tenure in five year increments, and add one first type icon (e.g., a star) for each five years until it gets fewer than five years left. One second type icon (e.g., a circle) may be used to represent each of the remaining year(s).

In one implementation, the individual's tenure may be divided by the first period of time to calculate the number and types of icons to be used. The integer result may be represented by the first type of icon, one for each five years. The remaining years may be represented by the second type of icon, one for each year.

In one example, the individual's tenure with the organization is eight years and five months. With the methods above, the personnel information management server 110 may determine that the individual's tenure includes one first period (i.e., five years), three second periods (i.e., one year), and five months. The personnel information management server 110 may then determine to use one star to represent the one first period, three circles to represent the three second periods, and one circle to represent the remaining five months.

Alternatively, as shown in the area 503 in FIG. 5, the individual's tenure may be represented by one star and three circles, with the remaining five months ignored to keep the representation simple, since the five months are not very significant compared to the eight year long tenure.

In one implementation, a fully filled circle may be used to represent each full year, and a hollow circle may be used to represent a partial year if there are months remaining in the individual's tenure. In one example, the individual's tenure with the organization is four years and four months. The personnel information management server 110 may determine that the individual's tenure has no first period, but has four second periods (i.e., one year), and four months. The personnel information management server 110 may then determine to use four fully filled circles to represent the four second periods, and one hollow circle to represent the remaining four months, as shown in an area 703 in FIG. 7A.

Figure 7A:
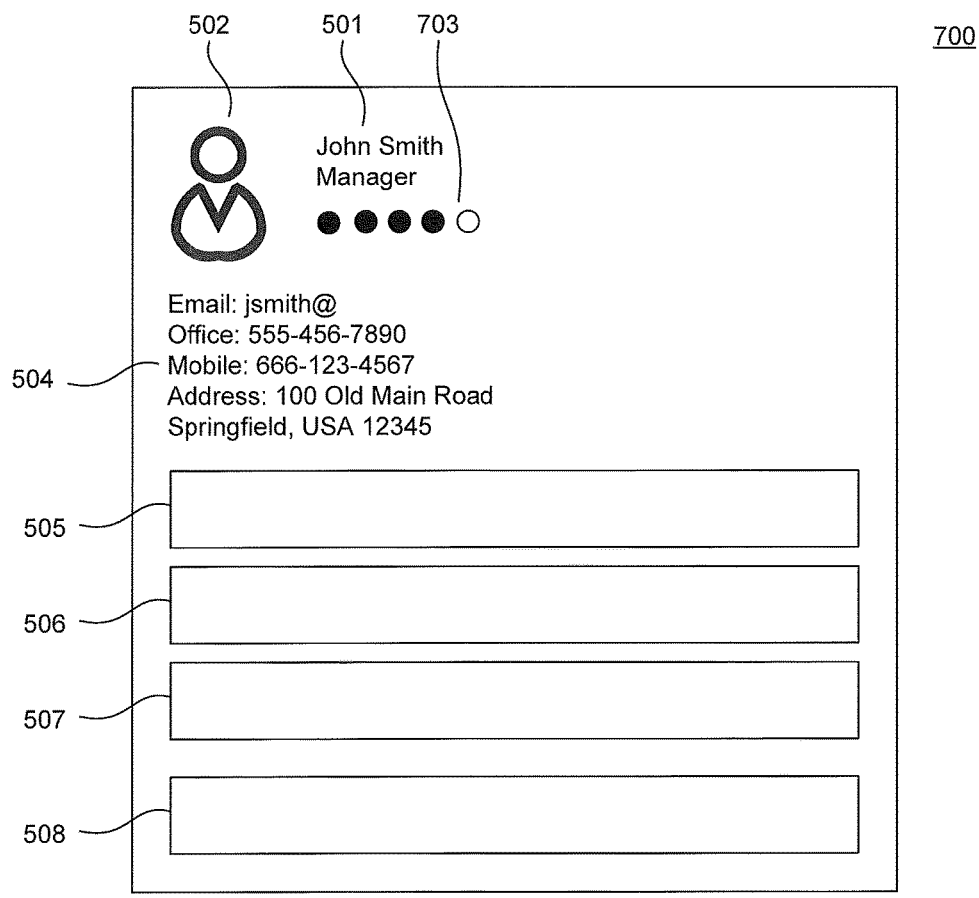
FIGS. 7A and 7B each illustrates an example individual profile page for displaying personnel information according to one embodiment of the present invention.
Figure 7B:
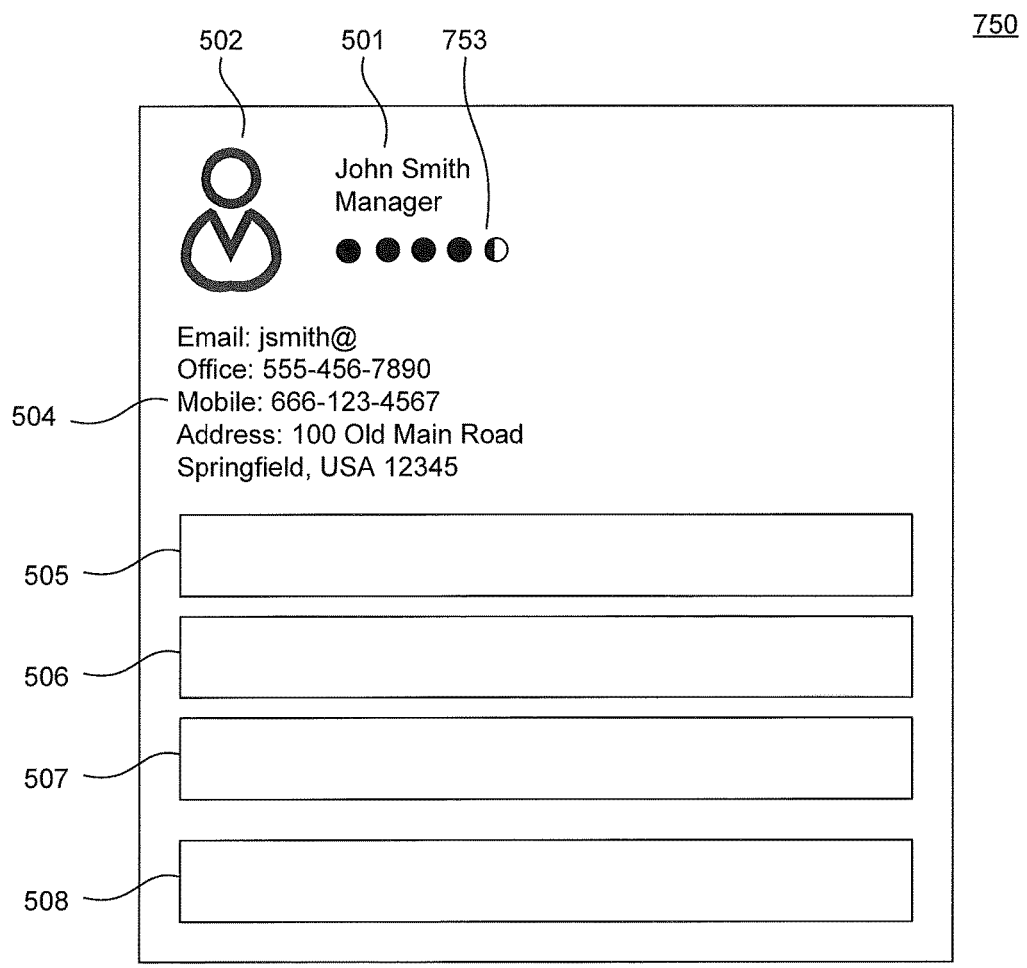

Alternatively, a partially filled circle may be used to represent a partial year, and the portion filled may be in proportion with the number of months passed, e.g., using a 33.3% filled circle to represent the four months remaining in the individual's tenure, as shown in an area 753 in FIG. 7B.

In one example, an individual may have joined the organization via acquisition. He spent seven years with the acquired company, and two years and six months with the current company. His tenure with the acquired company may be included in his tenure on the profile page, and be represented by the first type of icon and the second type of icon, but in a different color. For example, his tenure may be represented by two fully filled circles and one 50% filled circle in gray for his tenure with the current company, and one star and two circles in black for his tenure with the acquired company, as shown in an area 803 in FIG. 8.

At 613, the individual profile page, e.g., the individual profile pages 500, 700, 750, 800 or 900 in FIG. 5, 7A, 7B or 8, may be rendered by the personnel information management server 110.

At 621, it may be determined if a user hovers over or clicks on the area for displaying tenure (e.g., 503, 703 or 803).

Figure 8:
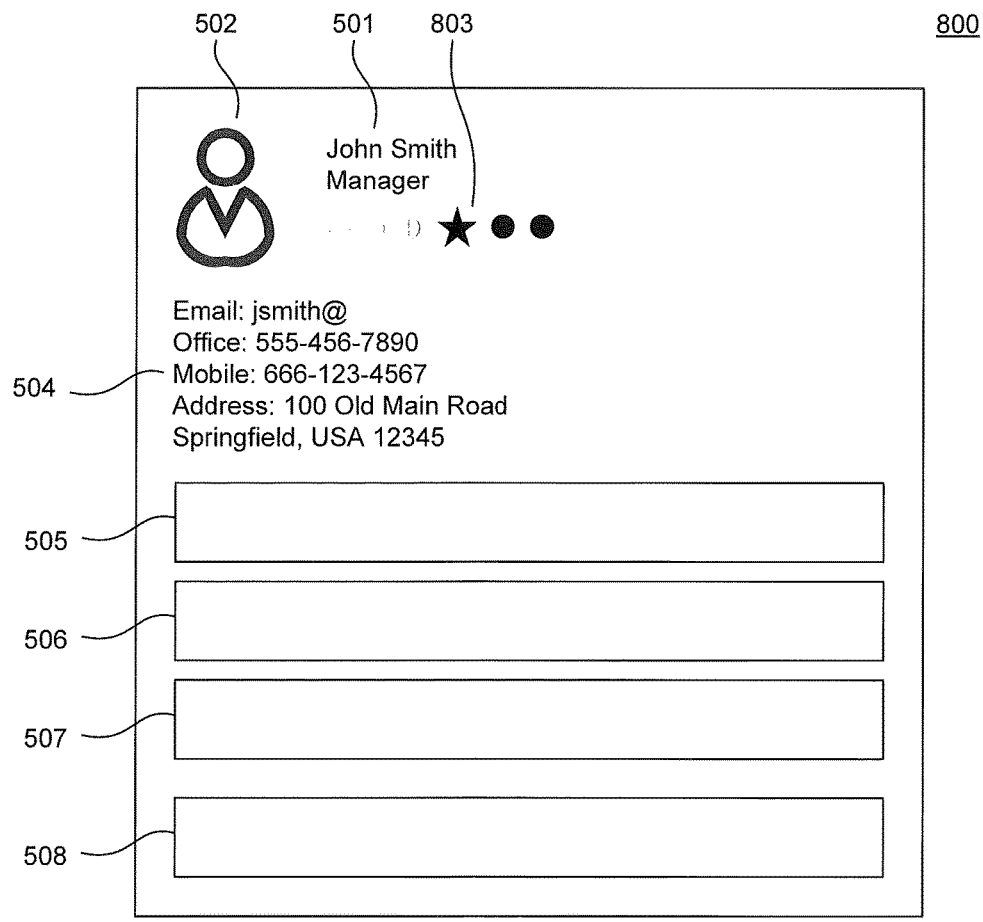
FIG. 8 illustrates an example individual profile page for displaying personnel information according to one embodiment of the present invention.

If yes, at 623, the individual's actual tenure may be displayed in a pop-up window, e.g., eight years and five months in FIG. 5, four years and four months in FIG. 7A or 7B, or seven years with the acquired company and two years and six months with the current company in FIG. 8.

At 631, it may be determined if there is a request for updating the personnel information. If yes, the process may return to 603 to display a user interface for receiving the personnel information. Otherwise, the process may return to 605 to wait for a request for an individual profile page.

Figure 9:
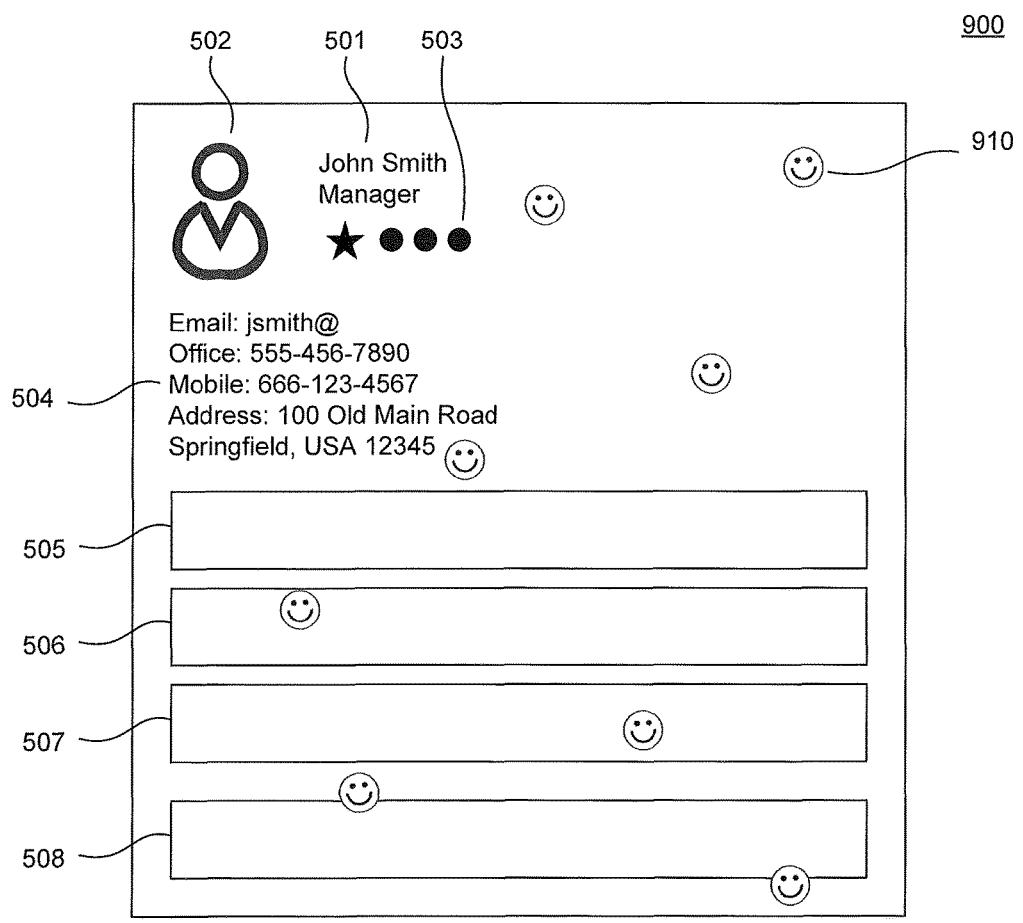
FIG. 9 illustrates an example individual profile page for displaying personnel information according to one embodiment of the present invention.

In one implementation, a special profile page may be displayed on the individual's anniversary with the organization. The personnel information management server 110 may check the individual's start date in the personnel information management database 130 before rendering the individual profile page to determine if it is the individual's anniversary. If yes, the individual profile page may be displayed with celebration Emoji 910 snowing down, as shown in FIG. 9. In one example, the individual's birthday may be stored in the database 130 and the celebration Emoji 910 may be displayed on the individual's birthday.

In one implementation, the individual's tenure may be displayed together with the individual's name when the individual's name is displayed, e.g., in a search result page, or in a message.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A computer-implemented method for displaying an individual profile page in an organization directory, the method comprising:
   storing the individual's name and start date with the organization in a database;
   receiving a request for displaying the individual profile page;
   comparing the individual's start date with the current date to determine the individual's tenure with the organization;
   determining using a first type of icon to represent a first period of time of the individual's tenure with the organization and a second type of icon to represent a second period of time of the individual's tenure with the organization, wherein the first period of time is longer than the second period of time;
   determining a first number of the first type of icon and a second number of the second type of icon needed to represent the first period of time and second period of time of individual's tenure with the organization respectively; and
   rendering the individual profile page, wherein the individual profile page comprises a first area for displaying the individual's tenure with the organization, and wherein the first area comprises the first type of icon and the second type of icon.

2. The method of claim 1, further comprising: determining that the individual's tenure exceeds the first period of time, counting the individual's tenure with the first period of time as the increment, and using one first type of icon for each first period of time in the individual's tenure.

3. The method of claim 2, further comprising: using one second type of icon for each second period of time when there is one or more years remaining in the individual's tenure.

4. The method of claim 1, further comprising: dividing the individual's tenure by the first period of time, and using the first type of icon to represent the integer in the result.

5. The method of claim 1, wherein the first period of time is five years.

6. The method of claim 1, wherein the second period of time is one year.

7. The method of claim 1, wherein the first type of icon representing the first period of time of the individual's tenure with the organization is a star.

8. The method of claim 1, wherein the second type of icon is a circle.

9. The method of claim 1, wherein the individual's tenure includes whole years with the organization only.

10. The method of claim 1, further comprising: using a partially filled circle to represent a partial year in the individual's tenure, with the portion filled in proportion with the number of months passed.

11. The method of claim 1, further comprising: using a hollow circle to represent a partial year in the individual's tenure.

12. The method of claim 1, further comprising: when the individual joins the organization via acquisition, using the first type of icon and the second type of icon in a different color to represent the individual's tenure with the acquired company.

13. The method of claim 1, further comprising: displaying the individual's tenure in years and months when the first area is clicked on or hovered over.

14. The method of claim 1, further comprising: displaying an anniversary recognition on the individual profile page.

15. The method of claim 14, wherein the anniversary recognition comprises celebration Emoji.

16. The method of claim 1, further comprising: displaying a birthday celebration on the individual profile page.

17. The method of claim 1, further comprising: determining if the personnel information needs to be updated.

18. The method of claim 1, further comprising: displaying the individual's tenure together with the individual's name when the individual's name appears on a search result page.

19. A non-transitory computer-readable medium for generating an individual profile page in an organization directory, the computer-readable medium comprising instructions that, when executed by a computer, cause the computer to:
store the individual's name and start date with the organization in a database;
receive a request for displaying the individual profile page;
compare the individual's start date with the current date to determine the individual's tenure with the organization;
determine using a first type of icon to represent a first period of time of the individual's tenure with the organization and a second type of icon to represent a second period of time of the individual's tenure with the organization, wherein the first period of time is longer than the second period of time;
determine a first number of the first type of icon and a second number of the second type of icon needed to represent the first period of time and second period of time of the individual's tenure with the organization respectively; and
render the individual profile page, wherein the individual profile page comprises a first area for displaying the individual's tenure with the organization, and wherein the first area comprises the first type of icon and the second type of icon.

* * * * *